United States Patent
Eastman et al.

(10) Patent No.: US 9,032,169 B2
(45) Date of Patent: May 12, 2015

(54) METHOD FOR HIGH PERFORMANCE DUMP DATA SET CREATION

(75) Inventors: Justin Paul Eastman, Tucson, AZ (US); Robert Stanley Gensler, Jr., Vail, AZ (US); Jeffrey Richard Suarez, Tucson, AZ (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 161 days.

(21) Appl. No.: 13/479,584

(22) Filed: May 24, 2012

(65) Prior Publication Data

US 2013/0318312 A1 Nov. 28, 2013

(51) Int. Cl.
*G06F 11/14* (2006.01)

(52) U.S. Cl.
CPC ........ *G06F 11/1448* (2013.01); *G06F 2201/84* (2013.01)

(58) Field of Classification Search
CPC .................. G06F 11/1448; G06F 2201/84
USPC ........................................... 711/162, E12.103
See application file for complete search history.

(56) References Cited

U.S. PATENT DOCUMENTS

| | | | |
|---|---|---|---|
| 4,855,907 A * | 8/1989 | Ferro et al. ............................ | 1/1 |
| 6,981,102 B2 | 12/2005 | Beardsley et al. | |
| 7,130,931 B2 | 10/2006 | Thompson et al. | |
| 7,305,583 B2 | 12/2007 | D'Angelo et al. | |
| 7,467,266 B2 | 12/2008 | Burton et al. | |
| 7,594,085 B1 | 9/2009 | Rao | |
| 7,689,743 B2 | 3/2010 | Eastman et al. | |
| 7,941,620 B2 | 5/2011 | Eastman et al. | |
| 8,161,253 B2 | 4/2012 | Suarez | |
| 2001/0047461 A1 * | 11/2001 | Milillo et al. ................. | 711/162 |
| 2004/0059882 A1 * | 3/2004 | Kedem et al. ................. | 711/162 |
| 2005/0234847 A1 * | 10/2005 | Damien et al. ..................... | 707/1 |
| 2006/0020754 A1 * | 1/2006 | Suzuki et al. ................. | 711/114 |
| 2007/0061529 A1 * | 3/2007 | Eastman et al. ............. | 711/162 |
| 2008/0154968 A1 | 6/2008 | Eastman et al. | |
| 2010/0180093 A1 * | 7/2010 | Huber et al. .................. | 711/162 |
| 2010/0287354 A1 * | 11/2010 | Lehr et al. ..................... | 711/171 |

OTHER PUBLICATIONS

International Search Report and Written Opinion for PCT Application No. PCT/CN2013/072102 dated Jun. 6, 2013.

* cited by examiner

*Primary Examiner* — Hal Schnee
(74) *Attorney, Agent, or Firm* — Katherine S. Brown; Andrew M. Calderon; Roberts Mlotkowski Safran & Cole, P.C.

(57) ABSTRACT

A method, system and computer-usable medium which provides a format in which data is written to a dump data set to allow use of Fast Replication technology for both backing up and restoring of both datasets and volumes. Such a format allows any data that can be captured at a track level to be written to the dump data set via Fast Replication. When using this methodology of backing up and restoring, backups should be made to devices that support Fast Replication technology and restoration of the data should be to devices which are capable of being the target of a Fast Replication for that backup device.

18 Claims, 2 Drawing Sheets

METHOD FOR HIGH PERFORMANCE DUMP DATA SET CREATION

BACKGROUND

1. Field

The present invention relates in general to the field of systems, apparatus, and methods for managing data and more particularly relates to systems, apparatus, and methods for dump data set creation.

2. Description of the Related Art

Efficient data copy move solutions are an important aspect of managing and storing data. Data copying may include operations where data is moved from one location to another such as defragmenting data or backing up data. Solutions for copying data include input/output (I/O) operations where a host system reads and writes data to and from a data storage device. Such an approach is effective to copy data but can possibly create undesirable data copy overhead due to the input/output operations.

Another data copy solution includes Fast Replication, such as IBM's FlashCopy®, where a single request is sent from a host system to a data storage subsystem and the data storage subsystem performs the entire copy operation. Fast replication is often viewed as faster and more efficient than the input/output approach because Fast Replication substantially eliminates the need for multiple input/output operations. Though Fast Replication may reduce the data copy overhead generated by input/output operations, certain limitations to known Fast Replication technology exist.

For example, when creating a dump data set via, for example, a Data Facility Storage Management Subsystem data services set (DFSMSdss) type of data movement, Fast Replication technology may not be used. This issue is present because known Fast Replication technology only functions at a track level. This restriction prevents using Fast Replication when performing a DFSMSdss type of data movement. When performing a DFSMSdss type of data movement, the data, tracks or data set records, written to and restored from a dump data set are wrapped in metadata that is used to process the data properly.

SUMMARY

In accordance with the present disclosure, a method, system and computer-usable medium are disclosed which provides a format in which data is written to the dump data set to allow use of Fast Replication technology for both backing up and restoring of both datasets or volumes. Such a format allows any data that can be captured at a track level to be written to the dump data set via Fast Replication. When using this methodology of backing up and restoring, backups should be made to devices that support Fast Replication technology; and restoration of the data should be to devices which are capable of being the target of a Fast Replication for that backup device.

More specifically, in certain embodiments, the format for the dump data set removes the metadata that is traditionally wrapped around the data being backed up and instead inserts metadata to describe the tracks that are to follow. This format reduces the number of I/O writes that are required to write the dump data set and allows the data tracks of a data set to be moved with Fast Replication during the restore process. Such a methodology allows Fast Replication technology to be exploited to significantly decrease the amount of time required for both backing up and restoring of data sets and volumes. For backups that have many small data sets such an improvement can provide a noticeable performance increase. Additionally, for backups that have very large amounts of data, such an improvement provides an extremely significant performance improvement. Additionally, the format of this methodology can reduce the total number of tracks in a dump data set because full tracks may be written without the additional metadata for each data track.

In certain embodiments, the methodology redefines a format of the dump data set that the DFSMSdss operation uses. The methodology uses certain data (e.g., Virtual Sequential Access Method (VSAM) Volume Data Set (VVDS) data, Virtual Table of Contents (VTOC) data, data set, and/or volume) and wraps the data with a small amount (e.g., 32 bytes) of metadata to identify the data that follows in that particular track. The VVDS, VTOC, data set, and volume data actually reside on devices in full tracks. The methodology separates the metadata from that track and has the metadata precede the track images that are to follow. The metadata include the information that is needed for the Fast Replication operation, such as the number of tracks that follow, to provide the program with information regarding how many tracks to copy after the metadata with Fast Replication technology before expecting the next track containing the next set of metadata.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
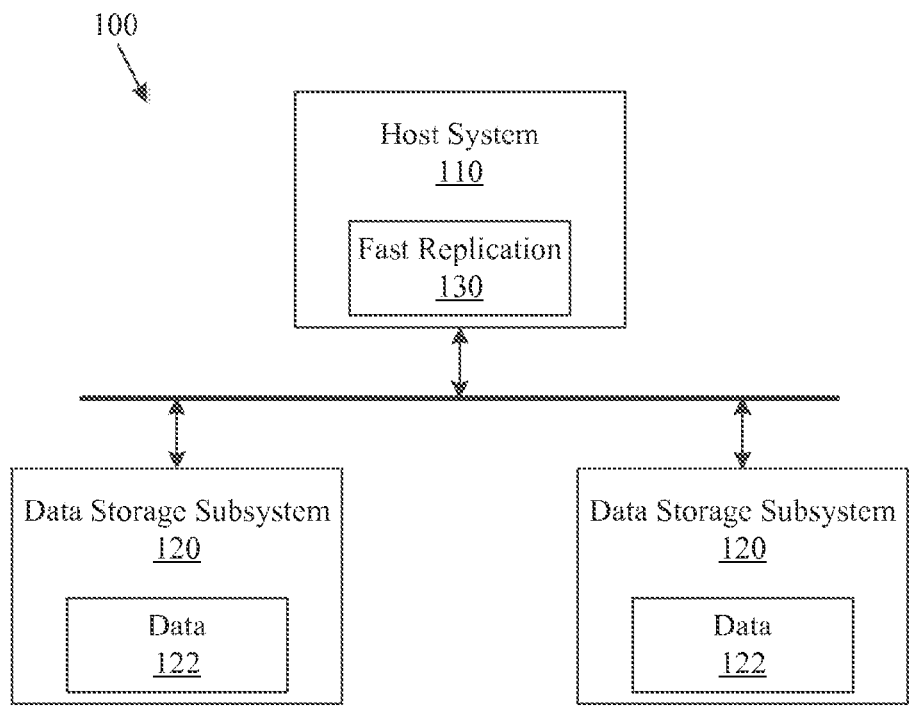
FIG. 1 shows a schematic block diagram of one embodiment of data copy system in accordance with the present invention.

Many of the functional units described in this specification have been labeled as modules, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by a compact disk, digital-videodisk, a magnetic tape, a Bernoulli drive, a magnetic disk, holographic disk or tape, a punch card, flash memory, magnetoresistive memory, integrated circuits, or other digital processing apparatus memory device, Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Referring now to FIG. 1, a schematic block diagram of one embodiment of a data copy system 100 in accordance with the present invention is shown. The system 100 includes a host system 110 and one or more data storage subsystems 120. The components of the system 100 cooperate to increase data copying efficiency.

In one embodiment, the host system 110 communicates a Fast Replication request for data 122 to a data storage subsystem 120 under control of a Fast Replication module 130. A data storage subsystem 120 may include any device capable of supporting a Fast Replication or FlashCopy® relationships and/or operations. If the Fast Replication request is granted by the data storage subsystem 120, the host system 110 may record the data 122 as moved. If the Fast Replication request is not granted, the host system 110 may estimate an expected wait time for a pending Fast Replication operation.

Figure 2:
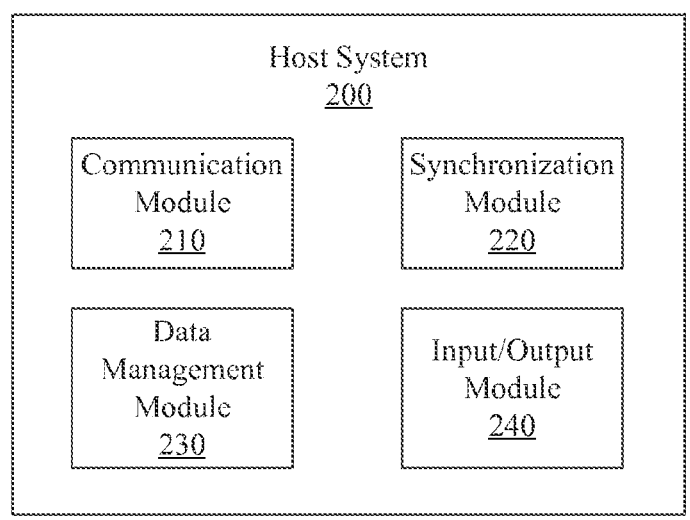
FIG. 2 shows a schematic block diagram of one embodiment of a host system in accordance with the present invention.

The Fast Replication module 130 provides a format in which data is written to the dump data set to allow use of Fast Replication technology for both backing up and restoring of both datasets or volumes. Such a format allows any data that can be captured at a track level to be written to the dump data set via Fast Replication. When using this module of backing up and restoring, backups are made to devices that support Fast Replication technology and restoration of the data are to devices which are capable of being the target of a Fast Replication for that backup device. I.e., data storage subsystems 120 support Fast Replication Referring to FIG. 2, is a schematic block diagram of one embodiment of a host system 200 in accordance with the present invention is shown. More specifically, the host system 200 includes a communication module 210, a synchronization module 220, a data management module 230, and an input/output module 240. The modules of the host system 200 cooperatively adapt to facilitate efficient data copy solutions.

In certain embodiments, the communication module 210 communicates a Fast Replication request for data to a data storage subsystem (not shown). A Fast Replication request may include a command to establish a Fast Replication relationship or FlashCopy® operation. The data involved in the Fast Replication relationship or operation may be organized by atomic units of movement such as bytes, words, blocks, tracks, sectors, extents, or the like. In some embodiments, the Fast Replication request includes a request to copy data to and from a location local to the data storage subsystem. In other embodiments, a Fast Replication request includes a request to copy data to or from anon-local location with respect to the data storage subsystem.

The data management module 230 may record the data as moved if the Fast Replication request is granted. In certain embodiments, recording the data as moved may include removing an entry representing the data from a list of entries representing data to be moved, and recording the time the Fast Replication request was granted. In this manner, the host system 200 may maintain a current and organized list of data to be copied.

Figure 3:
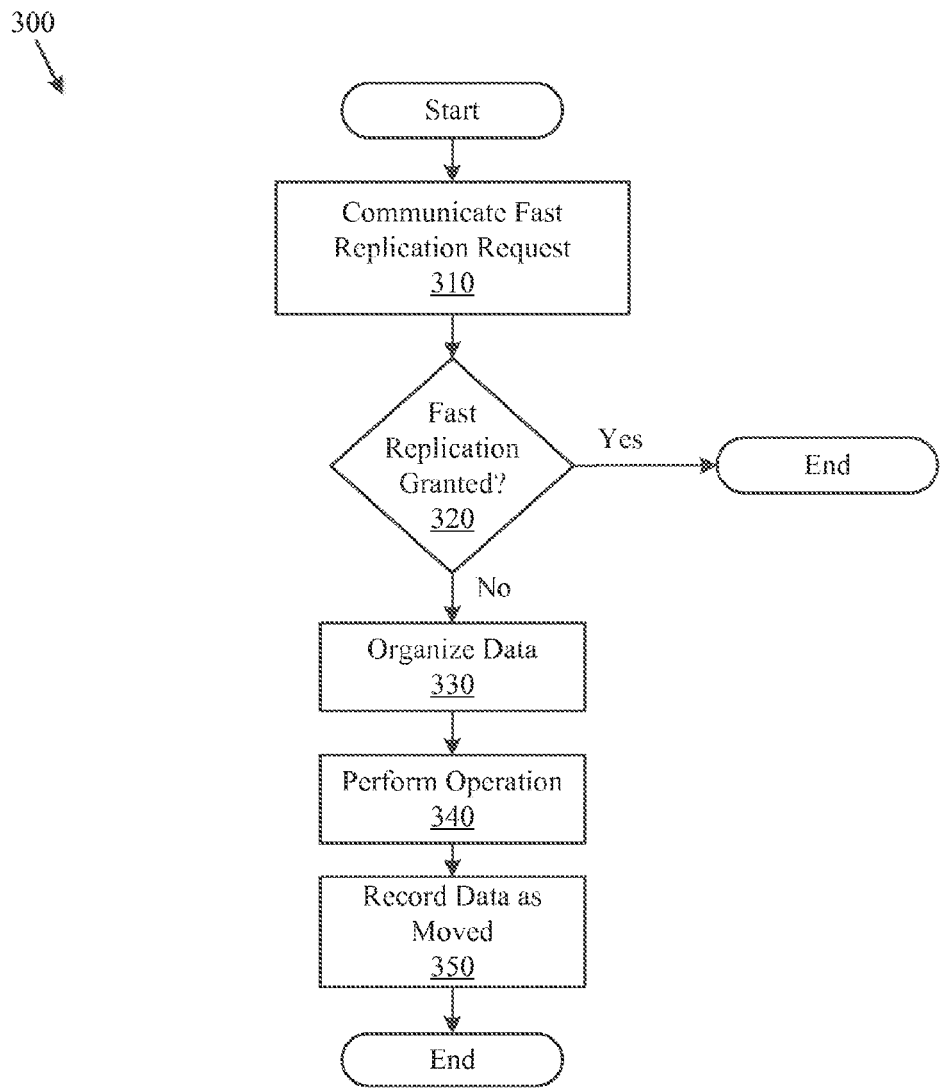
FIG. 3 shows a flow chart diagram of one embodiment of a method for copying data in accordance with the present invention.

Referring to FIG. 3, a flow chart diagram of one embodiment of a method 300 for copying data in accordance with the present invention is shown. The depicted method 300 includes the operations of communicating 310 a Fast Replication request, determining 320 whether the Fast Replication request was granted, organizing 330 the data for the Fast Replication operation according to the data set track format and performing 340 the Fast Replication operation using the data set track format and recording 350 the data as moved when the Fast Replication operation is performed. The operations of the method 300 illustrate one approach for efficiently copying data.

Communicating 310 a Fast Replication request may include a host system 110 communicating a Fast Replication request for data 122 to a data storage subsystem 120. Determining 320 if the Fast Replication request is granted may include the data storage subsystem 120 carrying out the Fast Replication request. If the Fast Replication request is granted the host system 110 may record the data as moved. In certain embodiments, recording the data as moved may include removing an entry representing the data from a list of entries representing data to be moved. A rejected Fast Replication request may include a scenario where the data corresponding to the Fast Replication requests is already in a Fast Replication relationship.

Figure 4:
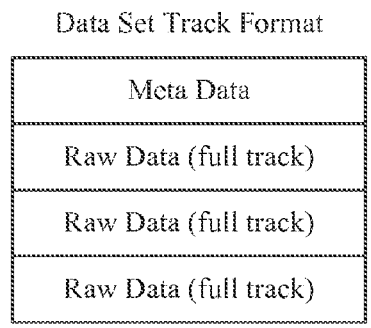
FIG. 4 shows a example of a data set track format.

Referring to FIG. 4, an example of a data set track format is shown. More specifically, in certain embodiments, the format for the dump data set removes the metadata that is traditionally wrapped around the data being backed up and instead inserts metadata to describe the tracks that are to follow. This format reduces the number of I/O writes that are required to write the dump data set and allows the data tracks of the data set to be moved with Fast Replication during the restore process.

In certain embodiments, the data set track format of the dump data set that the DFSMSdss operation uses certain data (e.g., Virtual Sequential Access Method (VSAM) Volume Data Set (VVDS) data, Virtual Table of Contents (VTOC) data, data set, and/or volume) and wraps the data with a small amount (e.g., 32 bytes) of metadata to identify the data that follows in that particular track. The VVDS, VTOC, data set, and volume data actually reside on devices in full tracks. The format separates the metadata from that track and has the metadata precede the track images that are to follow. The metadata include the information that is needed for the Fast Replication operation, such as the number of tracks that follow, to provide the program performing the Fast Replication operation with information regarding how many tracks to write or read after the metadata with the Fast Replication before expecting the next track containing the subsequent metadata.

The present invention improves system efficiency for copying or moving data. The present invention may be embodied in other specific forms without departing from its spirit or essential characteristics. Although the present invention has been described in detail, it should be understood that various changes, substitutions and alterations can be made hereto without departing from the spirit and scope of the invention as defined by the appended claims.

What is claimed is:

1. A system for copying data, the system comprising:
at least one data storage subsystem configured to support Fast Replication operations, the Fast Replication operation comprising performing an entire copy operation in response to a single request being sent to the data storage subsystem; a host system configured to:
communicate a Fast Replication request for data to the at least one data storage subsystem, the Fast Replication request comprising a request for the data to be moved via a Fast Replication operation;
perform a Fast Replication operation, the Fast Replication operation conforming to a Fast Replication data track format created to perform the Fast Replication operation, the Fast Replication data track format allowing any data that can be captured at a track level to be written to a dump data set via Fast replication; and
wherein the Fast Replication data track format comprises Virtual Sequential Access Method (VSAM) Volume Data Set (VVDS) data, Virtual Table of Contents (VTOC) data, a data set, and metadata to identify data that follows in a particular track on which to perform the Fast Replication operation before expecting a next track containing subsequent metadata;
the VVDS, VTOC, data set, and metadata reside on the data storage subsystem in full tracks; and
the Fast Replication data track format separates the metadata from a corresponding track and has the metadata precede track images that are to follow.

2. The system of claim 1, wherein the host system and the data storage subsystem are capable of Fast Replication operations.

3. The system of claim 1, wherein:
the Fast Replication data track format comprises a dump data set used by a DFSMSdss operation.

4. The system of claim 1, wherein:
the data that follows in the particular track comprises a number of tracks that follow the metadata.

5. The system of claim 1, wherein:
the Fast Replication data track format removes original metadata that is wrapped around the data, which is backed up, and inserts the metadata to describe the tracks that are to follow.

6. The system of claim 5, wherein:
the metadata includes a number of tracks that follow to provide the Fast Replication operation with information regarding how many tracks to write or read after the metadata before expecting a next track containing the subsequent metadata.

7. The system of claim 5, wherein:
the Fast Replication data track format is a format in which data is written to the dump data set to allow use of Fast Replication technology for both backing up and restoring datasets or volumes.

8. The system of claim 1, wherein the host system is configured to:
record the data as moved if a Fast Replication request is granted;
remove an entry representing the data from a list of entries representing data to be moved; and
record a time the Fast Replication request was granted such that the host system maintains a current and organized list of data to be copied.

9. An apparatus for copying data, the apparatus comprising:
at least one data storage subsystem configured to support Fast Replication operations, a Fast Replication operation comprising performing an entire copy operation in response to a single request being sent to the at least one data storage subsystem;
a host system coupled to the at least one data storage subsystem, the host system comprising a Fast Replication module, the Fast Replication module comprising instructions for:
communicating a Fast Replication request for data to the at least one data storage subsystem, the Fast Replication request comprising a request for the data to be moved via a Fast Replication operation; and
performing a Fast Replication operation, the Fast Replication operation conforming to a Fast Replication data track format, the Fast Replication data track format allowing any data that can be captured at a track level to be written to a dump data set via Fast replication; and wherein
the Fast Replication data track format comprises Virtual Sequential Access Method (VSAM) Volume Data Set (VVDS) data, Virtual Table of Contents (VTOC) data, a data set, and metadata to identify data that follows in a particular track on which to perform the Fast Replication operation before expecting a next track containing subsequent metadata;
the VVDS, VTOC, data set, and metadata reside on the data storage subsystem in full tracks;
the Fast Replication data track format separates the metadata from a corresponding track and has the metadata precede track images that are to follow; and
the Fast Replication data track format removes original metadata that is wrapped around the data to be moved and inserts the metadata to describe the tracks that are to follow.

10. The apparatus of claim 9, wherein the host system and the data storage subsystem are capable of Fast Replication operations.

11. The apparatus of claim 9, wherein:
the Fast Replication data track format comprises a dump data set used by a DFSMSdss operation.

12. The apparatus of claim 9, wherein:
the data that follows in the particular track comprises a number of tracks that follow the metadata.

13. The apparatus of claim 9, wherein:

the metadata provides the Fast Replication operation with information regarding how many tracks to write or read after the metadata before expecting a next track containing the subsequent metadata; and the Fast Replication data track format is a format in which data is written to the dump data set to allow use of Fast Replication technology for both backing up and restoring datasets or volumes.

14. The apparatus of claim 13, wherein the host system:

records the data as moved if a Fast Replication request is granted;

removes an entry representing the data from a list of entries representing data to be moved; and records a time the Fast Replication request was granted such that the host system maintains a current and organized list of data to be copied.

15. A computer readable storage medium tangibly embodying a program of machine-readable instructions executable by a processor for:

communicating a Fast Replication request for data from a host system to at least one data storage subsystem, the Fast Replication request comprising a request for the data to be moved via a Fast Replication operation; and performing a Fast Replication operation, the Fast Replication operation comprising performing an entire copy operation in response to a single request being sent to the at least one data storage subsystem, the Fast Replication operation conforming to a Fast Replication data track format, the Fast Replication data track format allowing any data that can be captured at a track level to be written to a dump data set via Fast Replication; and wherein the Fast Replication data track format comprises Virtual Sequential Access Method (VSAM) Volume Data Set (VVDS) data, Virtual Table of Contents (VTOC) data, a data set, and volume and metadata to identify data that follows in a particular track on which to perform the Fast Replication operation before expecting a next track containing subsequent metadata;

the Fast Replication data track format removes original metadata that is wrapped around the data to be moved and inserts the metadata to describe the tracks that are to follow;

the VVDS, VTOC, data set, and volume and metadata reside on the data storage subsystem in full tracks; and the Fast Replication data track format separates the metadata from a corresponding track and has the metadata precede track images that are to follow.

16. The storage medium of claim 15, wherein the host system and the data storage subsystem are capable of Fast Replication operations.

17. The storage of claim 15, wherein: the Fast Replication data track format comprises a dump data set used by a DFSMSdss operation.

18. The storage medium of claim 15, wherein:

the data that follows in the particular track comprises a number of tracks that follow the metadata so as to provide the Fast Replication operation with information regarding how many tracks on which to perform the Fast Replication operation before expecting a next track containing subsequent metadata.

\* \* \* \* \*